United States Patent

Ando et al.

[11] Patent Number: 5,302,472
[45] Date of Patent: Apr. 12, 1994

[54] METHOD OF OPERATING METAL-HALOGEN BATTERY

[75] Inventors: Yasuo Ando; Hiroshi Hashiguchi; Hiroshi Hosono, all of Tokyo, Japan

[73] Assignee: Kabushiki Kaisha Meidensha, Tokyo, Japan

[21] Appl. No.: 989,167

[22] Filed: Dec. 11, 1992

[30] Foreign Application Priority Data

Dec. 13, 1991 [JP] Japan .................. 3-330318

[51] Int. Cl.$^5$ .......................... H01M 10/44
[52] U.S. Cl. ........................ 429/50; 320/23
[58] Field of Search ............ 429/50, 105; 320/9, 320/23

[56] References Cited

U.S. PATENT DOCUMENTS

| | | | |
|---|---|---|---|
| 3,639,173 | 2/1972 | Stachurski . | |
| 3,813,301 | 5/1974 | Carr | 429/50 |
| 3,912,999 | 10/1975 | England | 320/22 |
| 4,217,533 | 8/1980 | Van Beek | 320/23 |
| 4,652,504 | 3/1987 | Ando | 429/105 |
| 4,857,419 | 8/1988 | Jinnai et al. | 429/13 |
| 4,977,364 | 12/1990 | Kordesch | 320/23 X |
| 5,028,860 | 7/1991 | Amano | 320/23 |
| 5,168,016 | 12/1992 | Hashimoto | 429/50 |

FOREIGN PATENT DOCUMENTS

| | | |
|---|---|---|
| 0204038 | 6/1985 | European Pat. Off. . |
| 0460515 | 12/1991 | European Pat. Off. . |
| 2249452 | 5/1975 | France . |
| 1227630 | 4/1971 | United Kingdom ........ 320/23 |

*Primary Examiner*—Stephen Kalafut
*Attorney, Agent, or Firm*—Bachman & LaPointe

[57] ABSTRACT

A method of operating a metal-halogen battery such as a zinc-bromine battery, intended to prevent dendrite from formation on an electrode during charging the battery. The method comprises the step of carrying out an operation of discharging the battery at a predetermined constant current having a first current value throughout charging the battery; and the step of initiating an operation of charging the battery at a second current value of two times the first current value and maintaining the changing operation at a third current value which linearly decreases from the second current value to a zero value toward a termination of charging the battery.

4 Claims, 2 Drawing Sheets

METHOD OF OPERATING METAL-HALOGEN BATTERY

BACKGROUND OF THE INVENTION

1. Field of the Invention

This invention relates to improvements in a method of operating a metal-halogen battery such as a zinc-bromine battery, and more particularly to a technique for preventing a dendrite from formation during changing the battery.

2. Description of the Prior Art

A metal-halogen battery such as a zinc-bromine battery includes a plurality of cells which are electrically connected in series with each other in order to generate a high voltage to be picked up. The respective cells are separated from each other by separator plates. Each cell includes a bipolar electrode plate which defines positive and negative electrode chambers on the opposite sides thereof. Two kinds of electrolyte solutions are respectively circulated through the positive and negative electrode chambers under the action of pumps thereby to accomplish charging and discharging the battery.

In such a zinc-bromine battery, metallic zinc is electrodeposited on the surface of the negative electrode during the charging while the electrodeposited metallic zinc is dissolved in the electrolyte solution during the discharging, thus developing an electromotive force. It is known that the electrodeposition of zinc takes the form of a dendrite, which has considerably shortens a battery service life. In order to improve such shortening of the battery service life due to the dendrite, a variety of countermeasures have been hitherto taken. For example, inhibitors are added to the electrolyte solutions; or a complete discharging is once carried out in one charging and discharging cycle in order to electrically remove the electrodeposited zinc.

However, difficulties have been encountered in such dendrite prevention measures. Concerning addition of the inhibitors, if organic inhibitors are employed, they are short in life and therefore cannot provide a stable dendrite formation preventing effect throughout a long period of time. If inorganic inhibitors are used, they can suppress the formation of dendrite upon forming a co-deposition between them and zinc; however, they forms a segregation so that the dendrite formation suppressing effect is unstable throughout a long period of time. Concerning carrying out the complete discharging, it needs several hours and is unavoidably required in each charging and discharging cycle. This is very inconvenient and requires a device for causing the complete discharging.

SUMMARY OF THE INVENTION

It is an object of the present invention is to provide an improved method of operating a metal-halogen battery, which can effectively overcome drawbacks encountered in conventional operating methods of a metal-halogen battery.

Another object of the present invention is to provide an improved method of operating a metal-halogen battery, by which electrodeposition of a metal on the surface of an electrode can be effectively prevented from taking the form of dendrite while prolonging the battery service life.

A method of operating a metal-halogen battery, according to the present invention comprises the step of carrying out an operation of discharging the battery at a predetermined constant current having a first current value throughout charging the battery; and the step of initiating an operation of charging the battery at a second current value higher than said first current value and maintaining the charging operation at a third current value which linearly decreases from said second current value to a zero value toward a termination of charging the battery.

During charging the battery, a metal is electrodeposited on the surface of an electrode of the battery. By virtue of the above-mentioned operational method of the battery, crystal of the electrodeposited metal does not take a grain form and takes a flat form, thereby effectively preventing formation of dendrite. Thus, according to the operational method of the present invention, a high dendrite formation suppressing effect can be always obtained without lowering the efficiency of the battery. Additionally, no complete discharging is required and therefore the battery is highly convenient in maintenance while rendering unnecessary a device for causing the complete discharging of the battery.

DETAILED DESCRIPTION OF THE INVENTION

Figure 1:
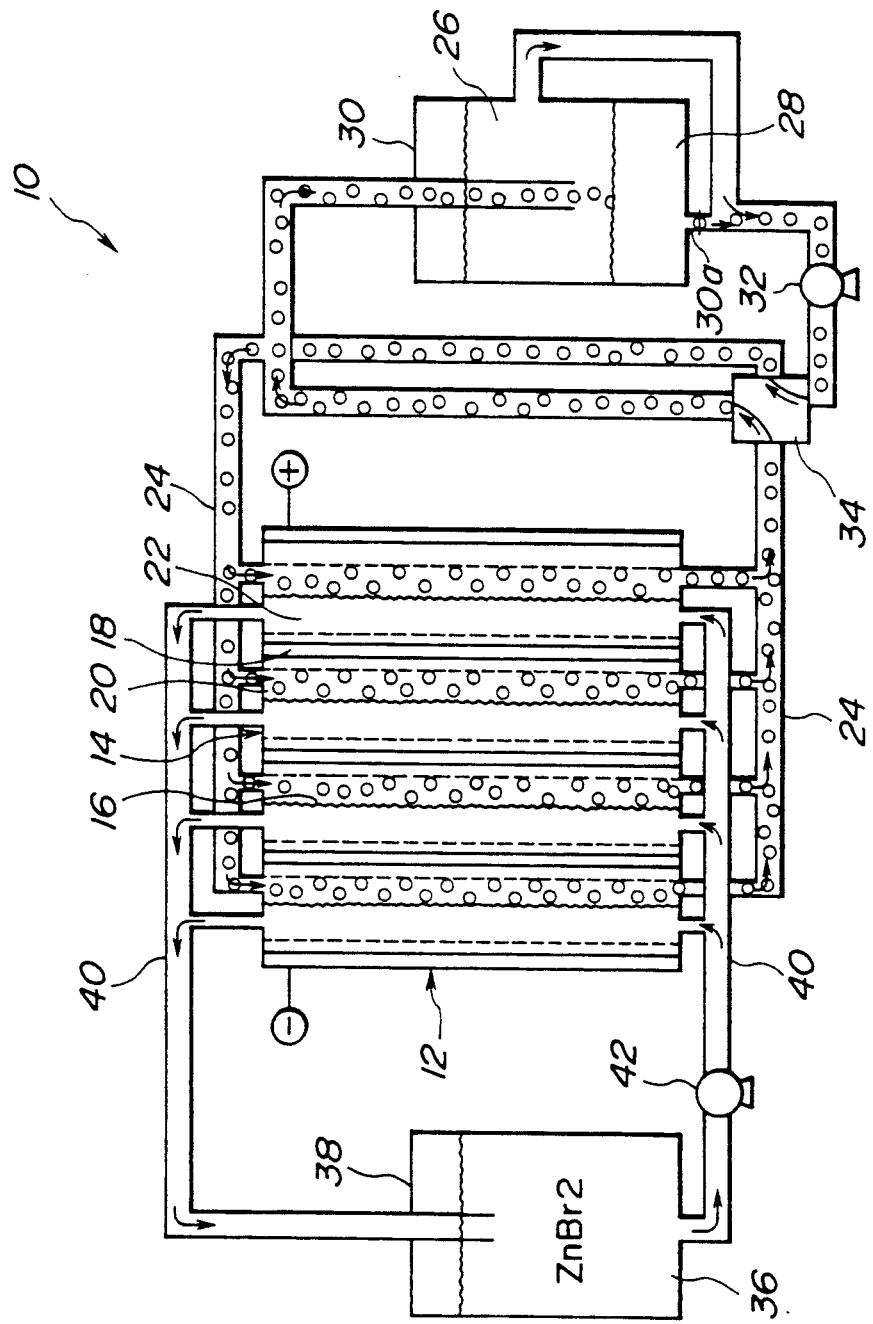
FIG. 1 is a schematic illustration of a metal-halogen battery to which the principle of the present invention is applied.

Referring now to FIG. 1 of the drawing, there is shown a metal-halogen battery or cell, in the form of principle, to which the principle of the present invention is applied. In this instance, the metal-halogen battery is a zinc-bromine battery or cell and designated by the reference numeral 10. The zinc-bromine battery 10 comprises a battery main body 12 which includes a plurality of battery cells 14. The respective battery cells 14 are separated from each other by separator plates 16, and electrically connected in series with each other. Each battery cell includes positive and negative electrode chambers 20 on either side of the bipolar electrode plate 18, the bipolar electrode being formed by the positive electrode chamber 20 of one cell and the negative electrode chamber of an adjacent cell. Each positive electrode chamber 20 is supplied with a positive electrolyte solution 26 and a bromine complex compound 28 in a positive electrolyte storage tank 30 through upper and lower positive electrolyte solution manifolds 24. The bromine complex compound 28 is located on the bottom of the positive electrolyte solution storage tank 30. The electrolyte solution 26 and the bromine complex compound 28 are circulated through the positive electrode chamber 20 under the action of a pump 32 and a four-way cock 34. The bromine complex compound 28 flows down through a valve 30a. The pump 32 and the cock 34 are disposed in a piping system (no numeral) for connecting the tank 30 and the manifolds 24.

Each negative electrode chamber 22 is supplied with a negative electrolyte ($ZnBr_2$) solution 36 in a negative electrolyte solution storage tank 38 through upper and lower negative electrolyte solution manifolds 40. The electrolyte solution 36 is circulated through the negative electrode chamber 22 under the action of a pump 42. The pump 42 is disposed in a piping system (no numeral) for connecting the tank 38 and the manifolds 40. It will be understood that charging and discharging the battery is carried out by circulating the electrolyte solutions 26, 36 respectively through the positive and negative electrode chambers 20, 22.

According to the principle of the present invention, the metal-halogen battery such as the zinc-bromine battery is operated in such a manner that an operation of discharging the battery is carried out at a predetermined constant current having a first current value throughout charging the battery; and additionally an operation of charging the battery is initiated at a second current value higher than the first current value and maintaining the charging operation at a third current value which linearly decreases from the second current value to a zero value toward a termination of charging the battery.

It will be understood that, in conventional methods of operating the metal-halogen battery, the charging operation of the battery is carried out at a constant current as same as in the discharging operation. However, according to the operating method of the present invention, the current value is increased to the high value and linearly decreased so as to take the zero value at the terminal period of the charging.

In order to evaluate the effect of the operating method according to the present invention, the following experiments were conducted:

EXPERIMENT 1

A mixture of a solution of 2.75 mol/l of $Zn^{2+}$, a solution of 4.5 mol/l of $Br^-$, a solution of 1 mol/l of $Cl^-$ and a solution of 1 mol/l of quaternary ammonium salt containing N-ethyl-N-methyl-morpholinium bromide and N-ethyl-N-methyl-pyrrolidium bromide (in a ratio of 1:1) as a bromine complex compound was supplied into a small cell. A carbon-plastic (composite of carbon and plastic) electrode and a zinc (99.99%) plate as the opposite electrode were dipped in the mixture solution in the cell, thereby preparing a battery cell. Then, electrodeposition was carried out at a current value of 20 mA/$cm^2$ for 4.5 hours so that zinc was electrodeposited on the carbon-plastic electrode. Thereafter, charging and discharging of the cell were carried out by the following methods:

(1) A conventional method

Discharging the cell was carried out at a current value of 20 mA/$cm^2$ (constant current) for 2 hours to remove the electrodeposited zinc on the carbon-plastic electrode. Then, charging the cell was carried out at the current value of 20 mA/$cm^2$ (constant current) for 2 hours. Such a one cycle of discharging and charging was repeated 5 times, upon which the surface of the carbon-plastic electrode was observed.

(2) A method of the present invention

Discharging the cell was carried out at a current value of 20 mA/$cm^2$ (constant current) for 2 hours to remove the electrodeposited zinc on the carbon-plastic electrode. Then, charging the cell was carried out at a current value which linearly decreased from 40 mA/$cm^2$ (at the initial time of the charging) to 0 mA/$cm^2$ during a time period of 2 hours. Such a one cycle of discharging and charging was repeated 5 times, upon which the surface of the carbon-plastic electrode was observed.

EXPERIMENT 2

A zinc-bromine battery of the electrolyte solution circulation type was produced to take a construction as same as that shown in FIG. 1 with the exception that 8 cells (14) were arranged side by side. Each of bipolar electrodes (18) had a surface area of 830 $cm^2$.

This zinc-bromine battery was operated in a conventional method which was the same as that in EXPERIMENT 1 except for the fact that zinc was electrodeposited on and removed from the bipolar electrode (18), and in a method of the present invention which method was the same as that in EXPERIMENT 1 except for the fact that zinc was electrodeposited on and removed from the bipolar electrode (18). In these operations in which 5 times of the discharging and charging cycle was repeated, discharging was finally made to 0 V and then a Coulombic efficiency (quantity of discharge electricity/quantity of charge electricity) of the battery was measured.

TEST RESULTS

Figure 3A:
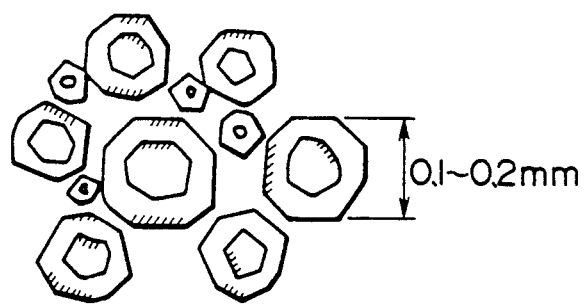
FIG. 3A is a plan view of crystal of zinc electrodeposited on the surface of an electrode when a metal-halogen battery was operated under a conventional operational method.
Figure 3B:
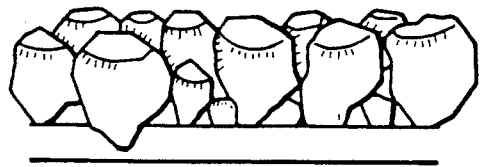
FIG. 3B is a side view of the electrodeposited zinc crystal of FIG. 3A.

According to the conventional method in EXPERIMENT 1, the electrodeposited zinc on the surface of the carbon-plastic electrode took a crystal grain form shown in FIGS. 3A and 3B. As shown in FIGS. 3A and 3B, most crystal grains of the electrodeposited zinc had a diameter ranging from 0.1 to 0.2 mm. It is to be noted that such crystal grains of zinc serve as nuclei of dendrite and therefore promotes the formation of the dendrite.

Figure 2A:
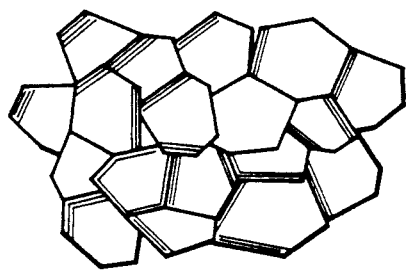
FIG. 2A is a plan view of crystal of zinc electrodeposited on the surface of an electrode when a metal-halogen battery was operated under an operational method of the present invention.
Figure 2B:
FIG. 2B is a side view of the electrodeposited zinc crystal of FIG. 2A.

According to the method of the present invention in EXPERIMENT 1, the electrodeposited zinc on the surface of the carbon-plastic electrode took a flat crystal form as shown in FIGS. 2A and 2B. As seen from FIGS. 2A and 2B, the crystals of zinc were not in the form of grain and flatly extend on the surface of the electrode so as to take a flat electrodeposited zinc state. It will be understood that such a flat electrodeposited zinc state can effectively suppress formation of the dendrite.

According to the conventional method in EXPERIMENT 1, the measured Coulombic efficiency was 62%. According to the method of the present invention in EXPERIMENT 1, the measured Coulombic efficiency was 78%. Thus, the Coulombic efficiency was considerably lowered when the zinc-bromine battery was operated under the conventional method. On the contrary, the same efficiency was maintained at a high level when the zinc-bromine battery was operated under the above-mentioned method of the present invention, by virtue of improved electrodeposited state of zinc on the electrode.

What is claimed is:

1. A method of operating a metal-halogen battery, comprising the steps of:
    carrying out an operation of discharging the battery at a constant current having a first current value throughout charging the battery; and
    initiating an operation of charging the battery at a second current value higher than said first current value and continuing the charging operation at a third current value which linearly decreases from said second current value to a zero value toward a termination of charging the battery.

2. A method as claimed in claim 1, wherein the charging operation initiating step includes initiating the battery charging operation at said second current value which is about two times said first current value.

3. A method as claimed in claim 1, wherein said battery is of a type wherein a plurality of electrode plates and a plurality of separator plates are alternately arranged so as to define positive and negative electrode chambers through which electrolyte solutions are circulated.

4. A method as claimed in claim 1, wherein said metal-halogen battery is a zinc-bromine battery.

* * * * *